United States Patent [19]
Jung

[11] Patent Number: 6,050,512
[45] Date of Patent: Apr. 18, 2000

[54] UNI-DIRECTIONAL CLUTCH BEARING WITH ON/OFF SWITCHING FUNCTION

[75] Inventor: Soo Jin Jung, Seoul, Rep. of Korea

[73] Assignee: Shin A Sports Co., Ltd., Incheon, Rep. of Korea

[21] Appl. No.: 09/093,696

[22] Filed: Jun. 9, 1998

[30] Foreign Application Priority Data

Jul. 14, 1997 [KR] Rep. of Korea .................... P97-32530

[51] Int. Cl.⁷ .................................................. A01K 89/02
[52] U.S. Cl. .................... 242/247; 188/82.84; 192/44; 192/45; 242/248
[58] Field of Search ......................... 188/82.84; 192/44, 192/45; 242/247, 248, 257

[56] References Cited

U.S. PATENT DOCUMENTS

| | | | |
|---|---|---|---|
| 4,712,661 | 12/1987 | Lederman et al. | 192/45 |
| 5,494,232 | 2/1996 | Hirano et al. | 242/247 |
| 5,765,669 | 6/1998 | Adams et al. | 192/44 |

*Primary Examiner*—Christopher P. Schwartz
*Assistant Examiner*—Devon Kramer
*Attorney, Agent, or Firm*—David G. Conlin; Christine C. O'Day; Dike, Bronstein, Roberts & Cushman, LLP

[57] ABSTRACT

A clutch bearing for preventing reverse rotation of a bushing received within the bearing includes a housing having a plurality of recesses, each recess having a shallow portion and a deep portion, an insert member disposed within the housing and having a plurality of retaining bars, a plurality of rollers each being received between two adjacent retaining bars, a clutch coupled to the insert member and operable to either dispose the rollers near the respective deep portions of the recesses for rotation in clockwise and counter-clockwise directions or dispose the rollers near the respective shallow portions of the recesses for preventing rotation in one direction.

2 Claims, 6 Drawing Sheets

UNI-DIRECTIONAL CLUTCH BEARING WITH ON/OFF SWITCHING FUNCTION

FIELD OF THE INVENTION

The present invention relates to a uni-directional clutch bearing, and more particularly to a uni-directional clutch bearing used for preventing reverse rotation of a spinning reel during fishing. The present invention is especially adapted to prevent reverse rotation of the long stroke spinning reel disclosed in the Korean Patent No. 44461 filed on Oct. 8, 1996.

BACKGROUND OF THE INVENTION

A conventional apparatus for preventing reverse rotation of a spinning reel is generally provided by a click gear installed inside a rotor of the spinning reel as described below.

As illustrated in FIG. 8, Korean Utility Model Publication No. 94-7711, which was assigned to Taiwa Seiko Corporation, discloses an apparatus for preventing reverse rotation of a spinning reel. The apparatus comprises an axis 6 integrally formed on a stopper click 4 coupled with a reverse click gear 3 inside a convexed portion of a rotor (not illustrated in the drawing), and an operative piece of the stopper click 4, which is operated by an actuating arm (not illustrated in the drawings) while journalling the axis 6 on the front of a main body 5 of the reel.

An operative body 7 is integrally installed at the axis 6 of the main body 5 of the reel. The operative piece 7 is operated by a cam portion of the actuating arm having a lever 8 supported inside the main body 5 of the reel. A normal press type spring 11 is installed on the stopper click 4 so as to engage the stopper click is with the click gear 3 for preventing reverse rotation.

According to the construction of the conventional apparatus for preventing reverse rotation of the spinning wheel as described above, if the lever 8 is moved toward the left side by the manipulating arms and thus the stopper click 4 is supported in a state of engaging the stopper click 4 with the click gear 4 for preventing reverse rotation, the rotor can be rotated in the clockwise direction but not in the counterclockwise direction due to the engaged state of the stopper click 4 and the click gear 3. Meanwhile, if the lever 8 is moved toward the right side by the actuating arm so that the stopper click 4 is in a state of disengagement separating the stopper click 4 from the click gear 3, the rotor can be freely rotated in either direction.

However, the conventional apparatus for preventing reverse rotation has a problem that the rotor slips when preventing reverse rotation. Therefore, it is a general practice to maximize gear tooth portion to ensure the engaged state of the stopper click 4 and the click gear 4. The number of gear teeth reduces in inverse proportion to the size of the gear tooth section, and reduction of the number of the gear teeth enlarges the angle of the guidance to reverse rotation. This disables a prompt prevention of the reverse rotation. Moreover, as illustrated in FIG. 8, if a stopper click is positioned on the floor of the gear 3, and the lever 8 is moved toward the right side for the purpose of preventing the reverse rotation, the rotor slips off the same length as the gear tooth portion until the end portion of the click 3 reaches the valley of the gear tooth portion. Accordingly, the conventional apparatus for preventing reverse rotation has a drawback of not fully guaranteeing an instantaneous braking.

Meanwhile, Japanese Utility Model Laid-Open No. 64-38963 discloses an apparatus for preventing reverse rotation which comprises a uni-directional bearing fitted around the internal circumference of a latch wheel, and a roller of the uni-directional bearing fitted around the external circumference of a bushing of a rotating axis.

However, the above apparatus has a drawback in that the circumferential velocity of the roller contacting surface decreases due to the small diameter of the bushing of the rotating axis, into which the uni-directional bearing roller is fitted. This creates a problem of not fully guaranteeing an instantaneous braking. Also, a load is partially put on the abutting surface of each component when preventing reverse rotation, thereby resulting in a possible deformation and a low durability of the roller.

The conventional bearing has no on/off switching function, and operates in uni-direction, thereby posing a problem of additionally installing a separate apparatus around the periphery of the unidirectional bearing. For instance, the apparatus disclosed in Japanese Patent Laid-Open No. 64-38963 has a construction in which a gear is fitted into the external periphery of the uni-directional bearing to prevent its rotation, while the gear teeth are detachably engaged with the gear. Thus, the conventional apparatus not only has a complicated construction but also requires a wide installation space.

Meanwhile, U.S. Pat. No. 5,494,232 granted to Hirano et al. on Feb. 27, 1996 ("Hirano") discloses another apparatus for preventing reverse rotation of a spinning reel used for fishing.

Referring to FIG. 9, the apparatus for preventing reverse rotation disclosed in Hirano comprises a circular holder 109 rotatably mounted on a bushing, a circular external frame 110 rotatably fixed on a reel casting, and rolling members 107 retained by the circular holder 109 and the circular external frame 110. The circular holder 109 comprises a guide recess 108 for receiving the rolling members 107 therein. Each guide recess 108 has an open slot 108' at its lower portion, and the rolling members 107 received by the guide recess 108 through the open slot 108' is partially exposed to be contacted with the bushing. The rolling members 107 contact with the internal surface of the circular external frame 110 to function as a spiral. A spring 111 is provided inside the guide recess 108 to ease the rolling members 107 so as to function as a spiral.

According to the above construction, the spiral function of the rolling members 107 is generated by the internal circumference. Specifically, if the rolling members 107 are positioned at the concave portion 122 by means of the rectangular internal surfaces 121, 123 of the circular external frame 110, the bushing can freely rotate in clockwise and counterclockwise directions. However, if the rolling members 107 are positioned apart from the concave portion 122, reverse rotation of the bushing is prevented due to a frictional contact with the rolling members 107.

According to the above construction, one of the rolling members 107 is received between the two internal surfaces 121, 123 of the circular external frame 110. Thus, the internal surface of the circular external frame 110 is shaped octagonally. Considering the size of the apparatus as well as the rotation in both directions of the circular holder mounted on the spinning reel, it is practically impossible for the internal surface to have a geometrical shape which is more rectangular than octagonal. Accordingly, the number of rolling members is limited to four. In that case, if any of the rolling members 107 is damaged or the function of the spring for easing the rolling members deteriorates, the bushing is offset to that direction, thereby being unable to prevent reverse rotation of the bushing. Also, the apparatus for preventing reverse rotation as disclosed in the aforementioned patent has a complicated construction with numerous fittings, thereby increasing the manufacturing cost.

SUMMARY OF THE INVENTION

Therefore, an object of the present invention is to resolve the above problems, and to provide a uni-directional bearing with an on/off switching function in a spinning reel used for fishing.

To achieve the above object, there is provided a clutch bearing for preventing reverse rotation of a bushing received within the bearing, comprising a housing having a plurality of recesses, each recess having a shallow portion and a deep portion, an insert member disposed within the housing and having a plurality of retaining bars, a plurality of rollers each being received between two adjacent retaining bars, a clutch coupled to the insert member and operable to either dispose the rollers near the respective deep portions of the recesses for rotation in clockwise and counter-clockwise directions or dispose the rollers near the respective shallow portions of the recesses for preventing rotation in one direction.

BRIEF DESCRIPTION OF THE DRAWINGS

The above object and other advantages of the present invention will become more apparent by the preferred embodiments thereof with reference to the accompanying drawings, in which.

DETAILED DESCRIPTION OF THE PREFERRED EMBODIMENTS

Figure 1:
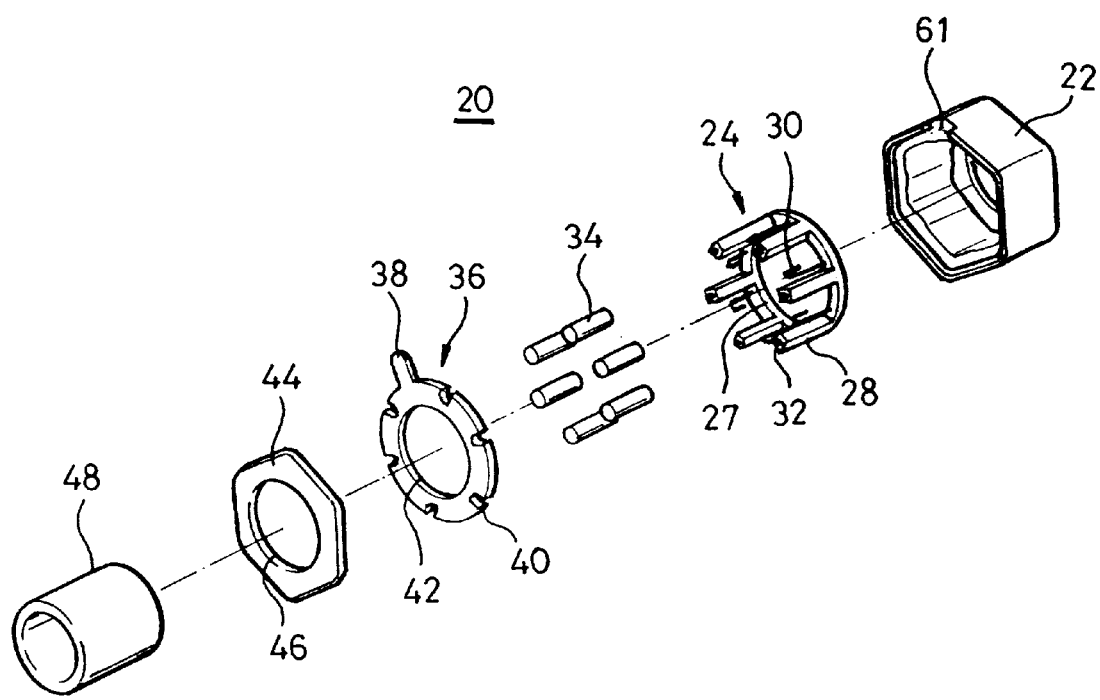
FIG. 1 is an exploded perspective view of the uni-directional clutch bearing according to a preferred embodiment of the present invention.

FIG. 1 is an exploded perspective view of the uni-directional clutch bearing with an on/off switching function according to the present invention. Referring to FIG. 1, the clutch bearing 20 of the present invention includes a housing 22 having one open side and the other closed side, an insert 24 molded with synthetic resin, a plurality (six in this embodiment) of rollers 34, a clutch lever 36, a cap 44 for closing the open side of the housing 22, and a bushing 48 fitted inside the bearing 20.

Figure 2:
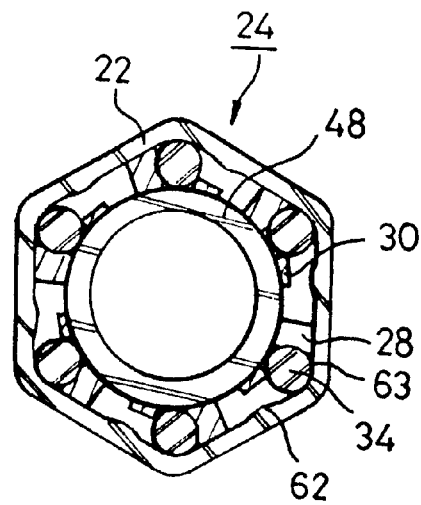
FIGS. 2 and 3 are cross-sectional views illustrating the unidirectional clutch bearing according to a preferred embodiment of the present invention in an assembled state.
Figure 3:
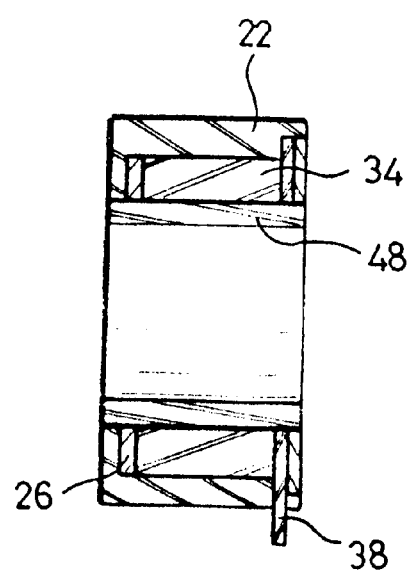
Figure 4:
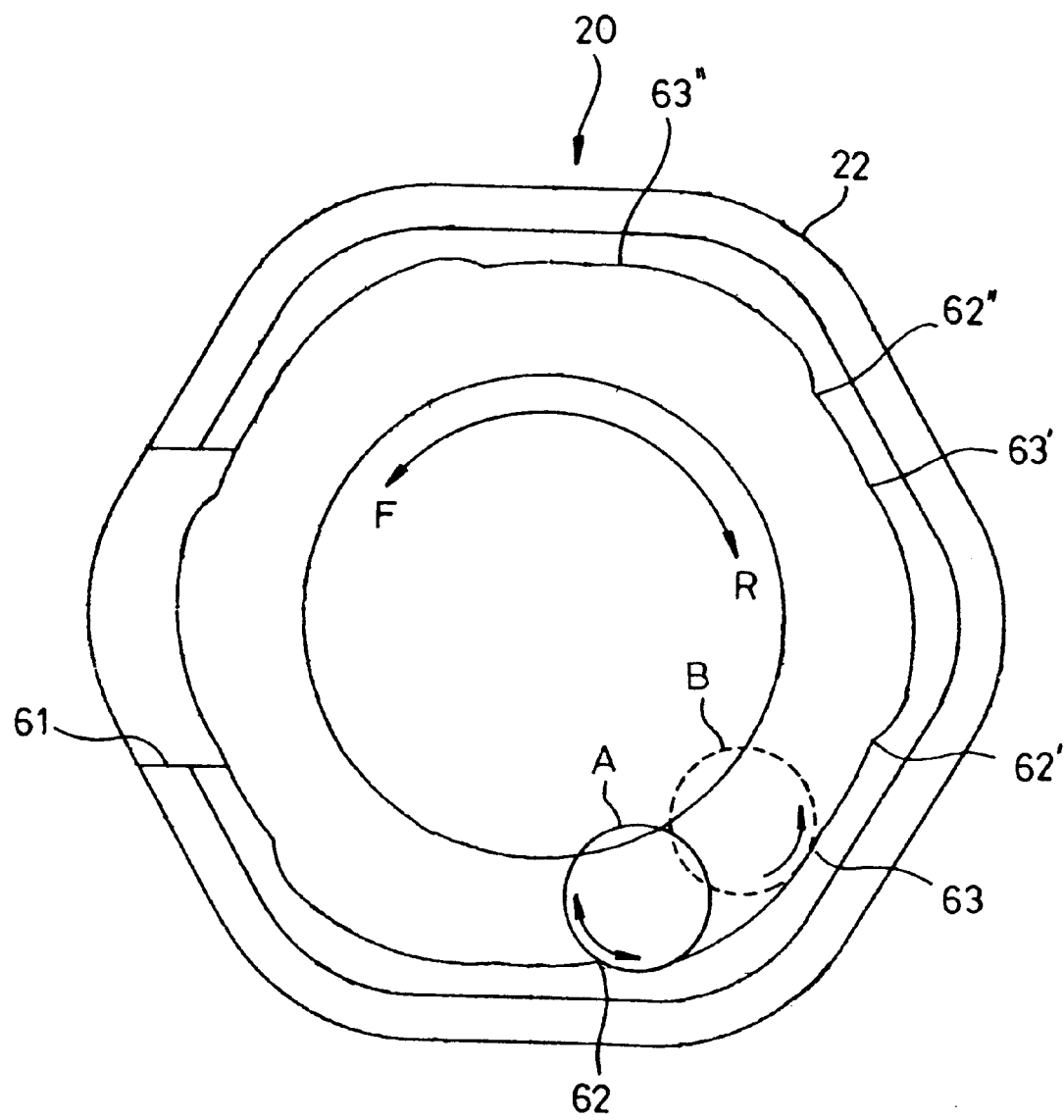
FIG. 4 is a top plan view of the housing of the unidirectional clutch bearing according to the present invention.

FIGS. 2 and 4 illustrate the housing 22 in an assembled state.

Referring to FIGS. 2 and 4, while the housing 22 and the insert 24 are located in an axial direction of the bearing, the roller 34 is posed between the internal surface of the housing 22 and the insert 24. The insert 24 comprises a circular base 26 and a plurality of retaining bars 28 protruded upward from the base 26. The retaining bar 28 comprises elastic plate springs 30 formed adjacent to the left side of the retaining bar 28 when seen from the center thereof. Also, the retaining bars 28 comprise bosses 32 received through a circular slot 40 of the clutch lever 36 as seen in FIG. 1. The cap 44 is forcibly fitted onto the open side of the housing 22.

Figure 5:
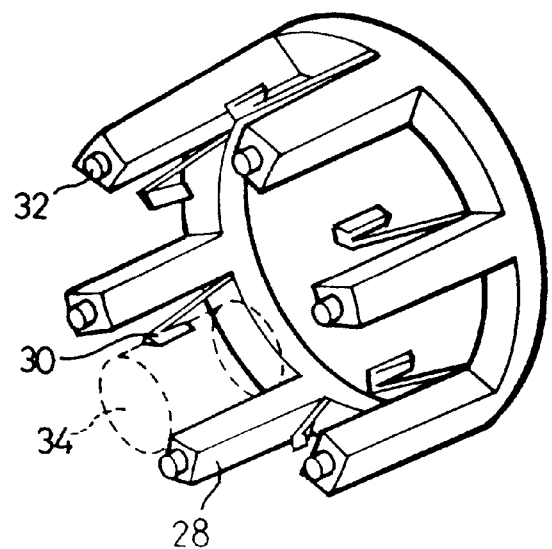
FIG. 5 is an enlarged perspective view of the insert of the uni-directional clutch bearing according to the present invention.

FIG. 5 is an enlarged perspective view of the insert 24 of the uni-directional clutch bearing according to the present invention.

Referring to FIG. 5, the insert 24 is formed with synthetic resin, and receives six rollers 34 therein. The rollers 34 are retained by the retaining bar 28 and elastic plate springs 30.

The clutch lever 36 comprises a tab 38, which is outwardly protruded from the outlet 61 of the housing 22 when received in the housing 22. If the tab 38 moves in the left/right direction, the uni-directional clutch bearing 20 is switched on/off. The "switched-on" state means that the uni-directional clutch bearing 20 rotates in one direction, for instance, a counterclockwise direction as shown in FIG. 4. The "switched-off" state means that the uni-directional clutch bearing 20 can freely rotate clockwise and counter-clockwise.

Referring to FIGS. 1 to 4, a plurality of circular recesses 62, 63; 62', 63'; 62", 63" are provided in the housing 22 so that rollers are rotatably received in the recesses. The recesses 62, 63 are shaped not to be dissociated from the rollers received inside the recesses, in cooperation with the insert. Specifically, the recesses 62, 63 are cut to have a steep slope 62 and a smooth slope 63 as shown in FIG. 4.

Referring to FIGS. 1 to 4, the roller A is positioned at the point where movement of the tab 38 of the lever 36 is suspended by the open slot 61 of the housing 22. It should be noted that the roller A does not contact with the protruded portion which is adjacent to the deep portion 62 of the recess. Accordingly, the roller A does not receive any pressure, and thus movable in any directions.

The roller B moved to the right by the lever 36 is positioned at the shallow portion 63 of the recess. By nature of the roller, the roller B positioned at this point tends to further roll to the right along the recess when rotating clockwise. In this case, however, the rolling of the roller is limited by the bushing 48 provided in the middle of the clutch bearing 20. In other words, rotation of the bushing 48 counterclockwise is instantaneously hindered by the six rollers.

In each case, the plate springs 30 eliminates the roller's tendency of moving to the left or right. Moreover, movement of the lever 38 to the left or right is constrained by the open slot 61 of the housing 22, thereby movement of the insert 24 is also constrained. Subsequently, movement of the roller 34 is also constrained.

The switched-on state of the bearing will now be explained in detail with reference to FIGS. 1 to 4. The roller of the clutch bearing, which is in a switched-off state in the drawing is denoted by a reference numeral A.

The roller A is positioned at the deep portion 62 of the recess under the state wherein the upper portion is pressed by the retaining bar 28 of the insert 24. Since the roller A is positioned on the deep portion 62 of the recess, only a small portion is protruded inwardly of the bearing. Accordingly, if a rotating force is added to the roller A clockwise, the roller A tends to roll while pushing away from the plate springs 30. Thus, the roller A can rotate clockwise. Also, if a rotating force is added to the roller A counterclockwise, the plate springs 30 is pushed backward by rolling of the roller A. Thus, the roller A can rotate counterclockwise. In other words, when positioned on the deep portion 62 of the recess, the roller A becomes rotatable in any directions.

The roller in the switched-on state is denoted by the reference numeral B in FIG. 4. If a rotating force is added to the roller B counterclockwise, the roller B rolls toward the deep portion 62 of the recess. Since the plate springs 30 on the left side is pushed backward, the roller B can rotate. If a rotating force is added to the roller B clockwise, however, the roller B tends to roll to the right along the shallow portion 63 of the recess. The bushing 48 provided in the middle of the insert bars further rolling of the roller B. Thus, the roller B is not rotatable clockwise.

Accordingly, the uni-directional clutch bearing can easily be placed in the switched-off state in which rotation in both clockwise and counterclockwise directions are possible and switched-on state in which the clockwise rotation of the rollers is prevented.

In the uni-directional clutch bearing according to the present invention as described above, the plate springs 30 of the insert 24 has a low tension due to its long length, thereby making the rotation in clockwise direction weak. Also, the uni-directional clutch bearing according to the present invention is manufactured as an incorporated product, and thus applicable to spinning reels, etc. as shown in FIG. 6, which illustrates the uni-directional clutch bearing according to another embodiment of the present invention.

Figure 6:
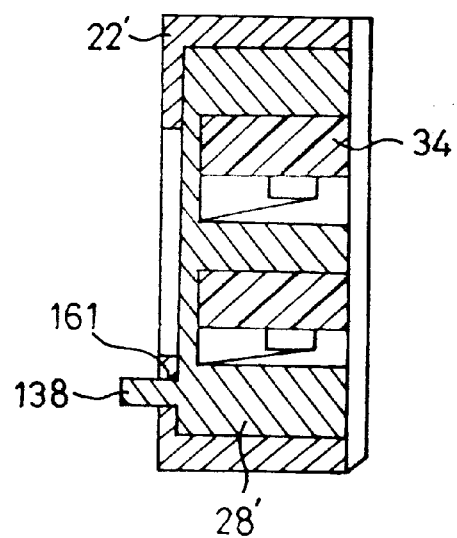
FIG. 6 is a sectional view of the uni-directional clutch bearing according to another embodiment of the present invention.

Referring to FIG. 6, a protrusion 138 of the insert 28' extends externally through a circular open slot 161 formed on one side of the housing 22'. The insert 28' can be rotated by manipulating the protrusion 138.

Figure 7:
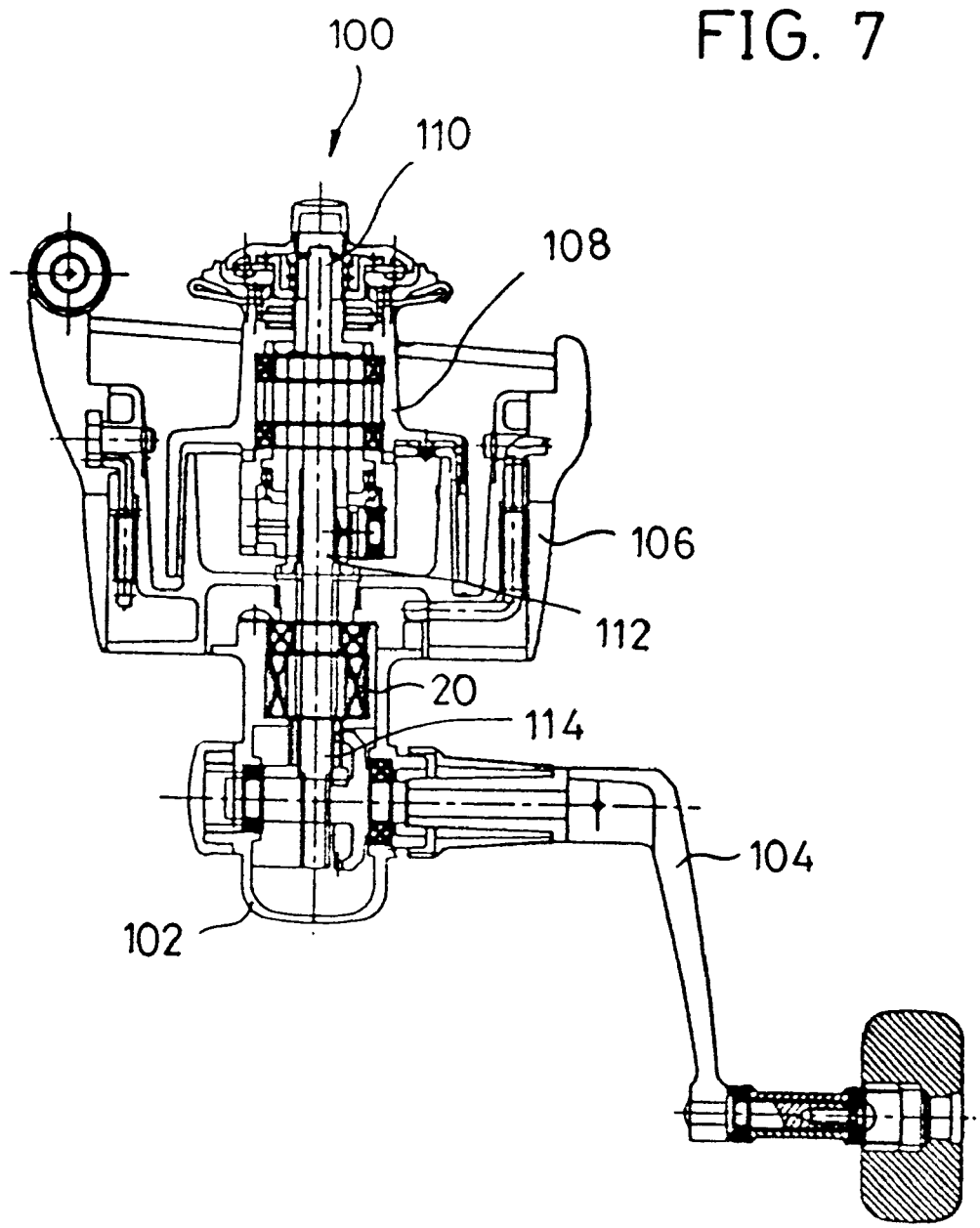
FIG. 7 is a schematic sectional view of a spinning reel incorporating the uni-directional clutch bearing according to the present invention.
Figure 8:
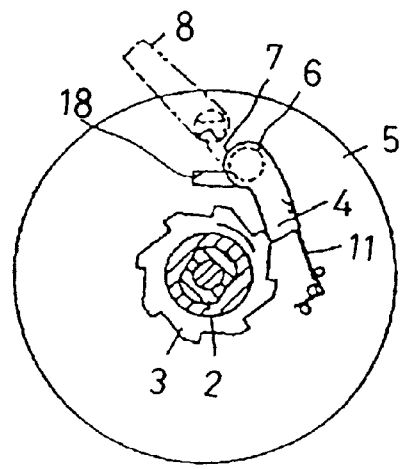
FIGS. 8 and 9 are views illustrating the conventional apparatus for preventing reverse rotation in a spinning reel.
Figure 9:
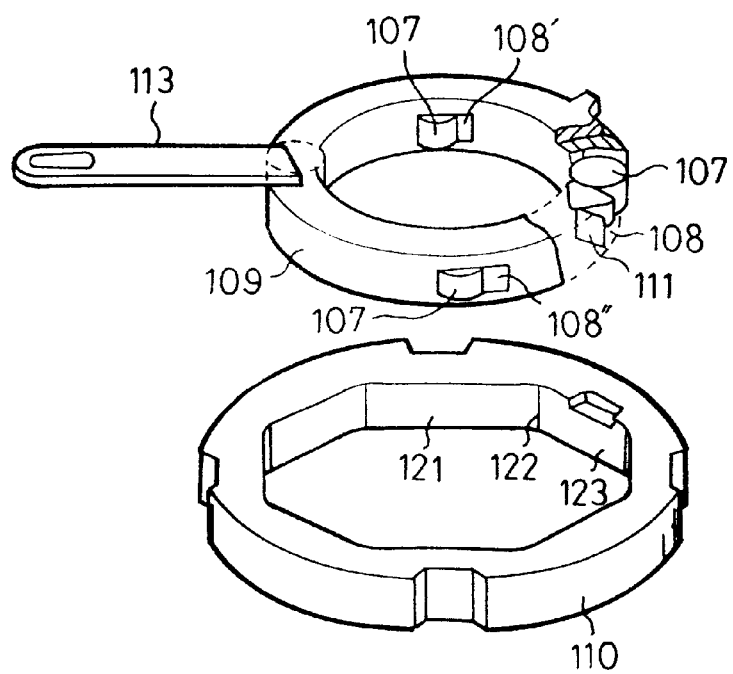

FIG. 7 is a cross-sectional view illustrating a spinning reel 100 in which a main shaft 110 is coupled with a pinion shaft 114 on the same axial line. The spinning reel 100 includes a main body 102, a handle assembly 104 engaged with the main body 102, a rotor 106 rotatably engaged with the front portion of the main body 102 and a spool unit 108 for performing reciprocating movement forward and backward. It is preferable that the uni-directional clutch bearing according to the present invention is provided on a pinion shaft 114.

According to the construction described above, if the pinion shaft 114 rotates in accordance with the rotation of the handle assembly 104, the rotating force is conveyed to the main shaft 110 coupled therewith. The pinion shaft 114 rotates the rotor 106 and a worm gear 112. The rotor 106 engaged with the front face of the main body 102 of the spinning reel 100 performs a reciprocating movement in accordance with rotation of the worm gear 112.

As described above, the uni-directional clutch bearing according to the present invention provides an advantage of easy switching on/off by manipulating the stopper lever (not illustrated in the drawing) and an applicability to the spinning reel as an incorporated assembly. As shown in FIG. 5, since the unidirectional clutch bearing according to the present invention is applicable to the pinion shaft, the distance between the bearing and the stopper lever, which is positioned on the outer portion of the main body can be shortened. Such shortening of the distance may affect the structural components arranged between the stopper lever and the bearing. In other words, the spinning reel, to which the bearing of the present invention is applied, can be freely laid out. Further, the simple construction of the uni-directional clutch bearing according to the present invention fully guarantees the switching-on/off function. Also, the long length of the springs of the insert maintains a weak tension applied to the roller.

While the present invention has been described and illustrated herein with reference to the preferred embodiments thereof, it will be understood by those skilled in the art that various changes in form and details may be made therein without departing from the spirit and scope of the invention.

What is claimed is:

1. A clutch bearing for preventing reverse rotation of a bushing received within the bearing, comprising:

a housing having an open side and a plurality of recesses formed on an inner circumference of the housing;

an insert member made of synthetic resin and positioned within the housing for retaining therein a plurality of rollers, the insert member having a circular base, a plurality of retaining bars protruded from the circular base, and a plurality of plate springs each disposed adjacent to each of the retaining bars to urge each of the rollers toward the adjacent retaining bar;

a clutch lever having a plurality of circular slots for receiving bosses formed on upper ends of the retaining bars, respectively, and a table for selecting a rotation direction of the bushing; and a cap for covering the open side of the housing.

2. The clutch bearing of claim 1, wherein the housing has an outlet of a predetermined shape and the clutch lever has a tab protruding externally from the housing through the outlet.

* * * * *